United States Patent [19]
Dockery et al.

[11] 3,982,845
[45] Sept. 28, 1976

[54] APPARATUS FOR PREPARING FURNITURE BACKS AND CUSHIONS FOR TUFTING

[76] Inventors: Benjamin F. Dockery, P.O. Box 452, High Point, N.C. 27261; Jack H. Mason, 1822 Pershing St., High Point, N.C. 27260

[22] Filed: June 28, 1974

[21] Appl. No.: 484,074

Related U.S. Application Data

[62] Division of Ser. No. 259,196, June 2, 1972, Pat. No. 3,832,083.

[52] U.S. Cl. .................................. 408/1 R; 83/41; 269/69; 408/44; 408/70
[51] Int. Cl.² ......................................... B23B 35/00
[58] Field of Search ................ 83/41, 405, 409; 408/12, 13, 15, 1, 22, 24, 25, 26, 29, 44, 69, 70; 144/35 R; 269/59

[56] References Cited
UNITED STATES PATENTS

| | | |
|---|---|---|
| 410,784 | 9/1889 | Colville .............................. 408/25 |
| 2,852,074 | 9/1958 | Wahl et al. ........................ 83/405 X |

*Primary Examiner*—Othell M. Simpson
*Assistant Examiner*—Z. R. Bilinsky

[57] ABSTRACT

A horizontally reciprocal table carrying a foam rubber or polyurethane slab on the surface thereof is indexed past a vertically reciprocal operating head having mounted thereon a plurality of sets of rotary cutters and saws, each set, when operated, forming a portion of a prescribed pattern, whereby as the slabs index past the operating head selected sets of cutters and/or saws are activated in response to a switch means engaged by activating elements on said table to form holes or slots in said slab according to said prescribed pattern.

4 Claims, 20 Drawing Figures

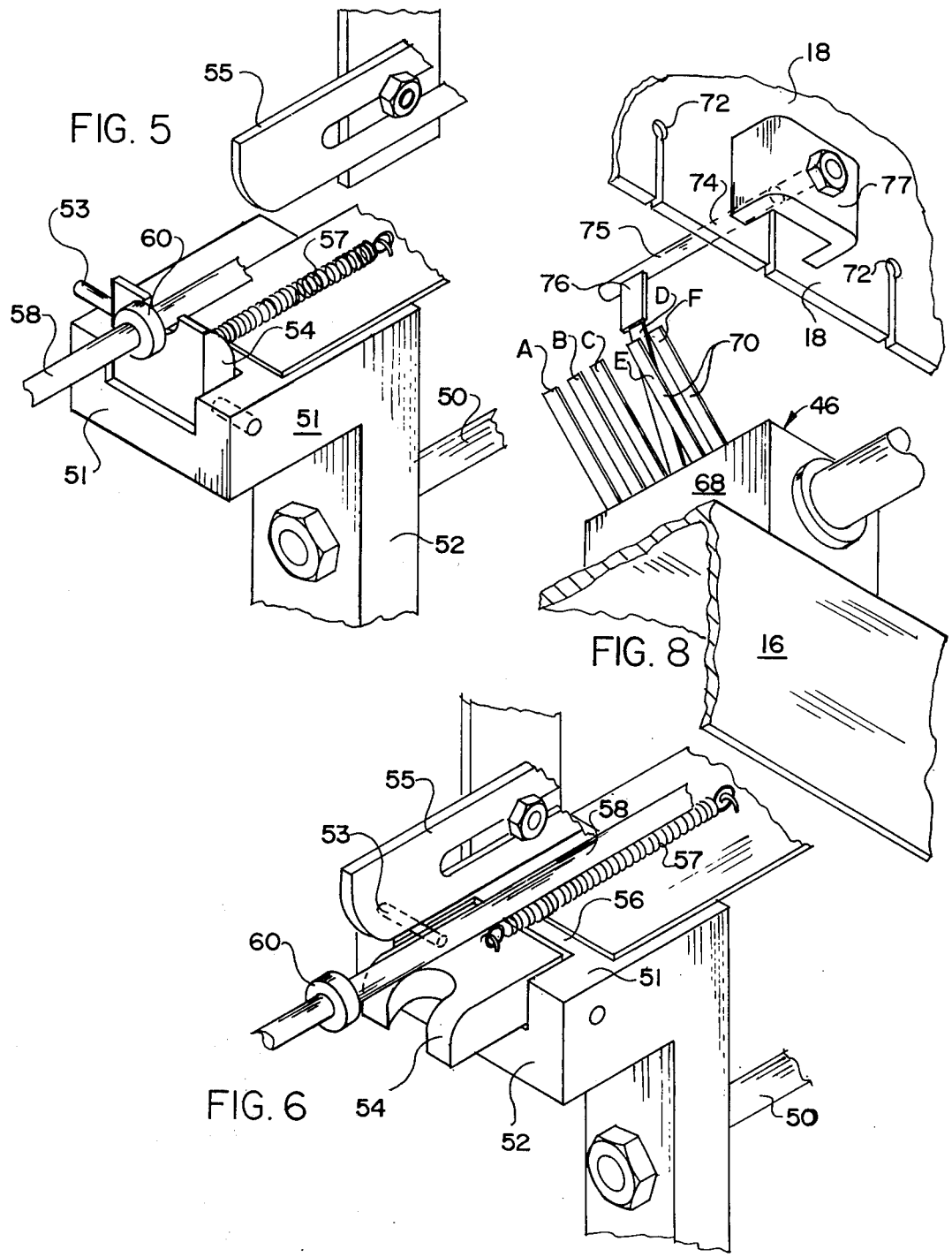

APPARATUS FOR PREPARING FURNITURE BACKS AND CUSHIONS FOR TUFTING

This is a division of application Ser. No. 259,196, filed June 2, 1972, now U.S. Pat. No. 3,832,083.

BACKGROUND OF THE INVENTION

In the preparation of foam rubber or polyurethane foam slabs or slabs formed of related materials which are used as a base for tufted, upholstered furniture cushions and backs and/or related products, it is necessary to provide in the foam slabs a pattern of holes where buttons are to be applied and/or through which tufting pins are inserted during the upholstery operation. Where tufting pins are used, they are inserted through the upholstery and pulled tight, and the upholstery fabric is creased or folded between the pins which, if allowed to remain in view, will make an unsightly final product. It is therefore conventional to form slits in the foam rubber extending partially through the thickness of the slab and radially from the holes forming the exterior perimeter of the pattern, and in some cases, between the inner holes in the pattern. The creases and folds in the fabric, as it is pulled tight, work their way into the slits, so that they are not visible in the completed chair back or cushion. Further, in certain sewn patterns (bisquit designs), there are no buttons or tufting pins, however slots are necessary for the reasons hereinabove mentioned.

According to conventional, known methods, such holes may be drilled manually through an overlay pattern with a hand drill, the pattern used to chalk mark the slot lines, then removed and the slots manually sawed with an electric saw knife or formed with a razor or knife-like blade. These methods are time consuming, and since performed and laid off by hand, generally inaccurate. Other known methods for forming the holes are by use of a punch press with male and female dies and by use of a steel rule die. The thickness of the foam slab in such punching processes is limited, and moreover, the slots must be laid off and cut in a separate operation. There is no known apparatus for performing this operation according to an automated process.

The present invention, on the other hand, is directed to an apparatus for automatically preparing the foam slabs by forming the holes of the pattern and the slits extend transversely and longitudinally from the holes forming the periphery of the pattern. Diagonal slots must be formed in a separate operation which is not within the scope of this invention. In this regard the apparatus includes an operating head mounted for reciprocal movement in a vertical path above a horizontally reciprocal table. The table includes indexing means associated therewith for shifting the table past said operating head at prescribed increments. The operating head includes a plurality of vertically reciprocal frames or brackets, each of which has mounted thereto one or more rotary cutters and/or saw which may be operated individually or simultaneously with each other. As the table indexes past the operating head a switch means associated with the table activates selected sets of cutters and saws to automatically form a prescribed pattern of holes and slits in the foam. In one embodiment of the apparatus switch-engaging elements are attached to the reciprocating table at intervals equal to corresponding longitudinal dimensions between adjacent hole or slit repeats in the foam slabs and are brought into engagement with a switch means as the table is indexed. The switch means is electrically connected to the operating head so that as various switch-engaging elements engage the switch means, prescribed frames or brackets containing drills and/or saws are activated.

The reciprocating table is indexed by means of a control rod attached to the underside thereof having a plurality of longitudinally spaced collars thereon which are sequentially engaged by an indexing lug pivotally attached to the piston of an air cylinder. As the piston is activated, the lug is in an upright position and engages one of the collars of the control rod, moving the table forwardly a prescribed distance. As the piston is retracted on the return stroke, the lug is pivoted down out of the way to pass beneath the succeeding collars and held down by an adjustable cam plate until the piston begins its next forward stroke, whereupon it returns to its upright position and engages the next succeeding collar. An air brake facilitates the stopping of the table at the end of each stroke and is activated by means of a limit switch attached to the piston which engages a switch element associated with the brake.

Hold down means are associated with each cutter and saw set, which rest against the surface of foam slab to hold the foam slab in position as the knife or drill is withdrawn. The hold down means floats on rods depending from the operating head or are spring biased so that they remain in engagement with the foam slabs for a brief period of time after the drill and knives have cleared. Also the hold downs engage the foam slabs at a point in time before the cutters and saws engage the foam to prevent the skewing of the slabs by action of the cutters and saws.

At the end of travel of the reciprocal table, a return air cylinder is activated to return the table back to its initial position. The cutting tools themselves are provided with a tapered side wall which affords a relief angle between the cutter tool and the foam wall surrounding the opening being formed as well as allowing the saws to be mounted on the same frame for "in line" slitting. An extractor extending axially within each cutter pushes out the cut foam plugs at the end of the cutting operation.

It is therefore an object of the present invention to provide an apparatus for automatically forming a prescribed pattern of holes and slits in foam slabs preparatory to an upholstery operation.

It is a further object of the present invention to provide an apparatus of the type described, wherein a foam slab positioned on a table is indexed horizontally past a vertically reciprocal operating head including a plurality of sets of rotary cutters and saws mounted thereon, each set being activated according to a preselected sequence to form a prescribed pattern of holes and slits in the foam slabs as they pass therebeneath.

It is still a further object of the present invention to provide an apparatus of the type described, wherein the positioning of rotary cutters and saws on said operating head may be varied so that a variety of patterns may be formed automatically as the foam slabs pass through.

It is still a further object of the present invention to provide an apparatus of the type described further including a table indexing means for moving the table a prescribed distance upon each activating thereof, and a return means for returning the table to its initial position after the operation is completed.

Another object of the present invention is to provide an apparatus of the type described further including a hold down means associated with the operating head to engage the foam slabs and prevent skewing thereof during the operation.

Another object of the present invention is to provide an improved rotary cutting tool for forming cylindrical openings through foam rubber slabs.

Yet another object of the present invention is to provide an apparatus of the type described including an improved connecting means between the reciprocal table and the bed on which it rests.

Other objects and features of the present invention will become apparent upon reading the following detailed specification in light of the drawings in which:

FIG. 5 is an enlarged perspective view, with parts broken away, illustrating the table advancing lug in its operative position;

FIG. 6 is an enlarged perspective view, with parts broken away for the sake of clarity, similar to FIG. 5, except showing the position assumed by the table advancing lug during the table return;

FIG. 8 is an enlarged perspective view, with parts broken away, illustrating a first embodiment of a switch means which activates selected functions of the operating head as it is engaged by switch activating elements during indexing of the horizontally reciprocal table;

Figure 17:
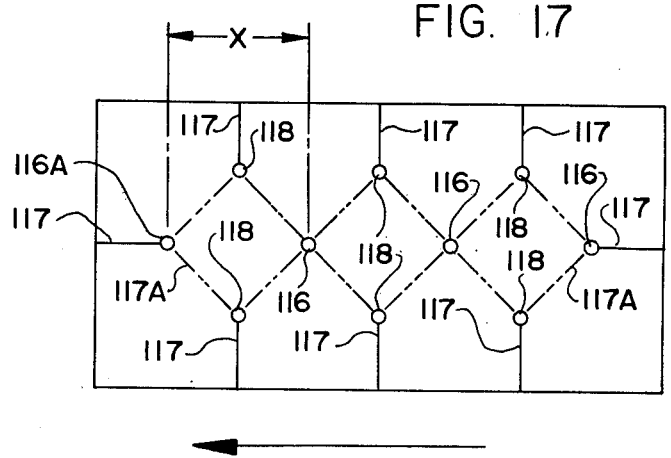
FIG. 17 is a plan view of a foam slab showing an illustrative pattern formed therein in preparation for the upholstery operation.

Referring first to FIG. 17, there is illustrated a foam slab S having a hole and slit pattern therein representative of one type commercially in use. This is referred to as a diamond pattern and includes a central index hole 116a followed by a pair of side holes 118, and another central hole 116; then the pattern is repeated throughout the length of the slab. After the index hole 116a is formed, during the remainder of the operation, at the end of each index stroke, one set of side holes 118 and a central hole 116 will be formed. The longitudinal distance $x$ between adjacent holes 116 is the distance that table T will be moved during each indexing thereof. Slits 117 extend between each hole 116 or 118 in the periphery of the pattern and the adjacent edge of slab S. As discussed previously, there diagonal slits 117a are to be utilized, they must be formed separately; i.e., they are not formed with the apparatus of this invention.

Figure 1:
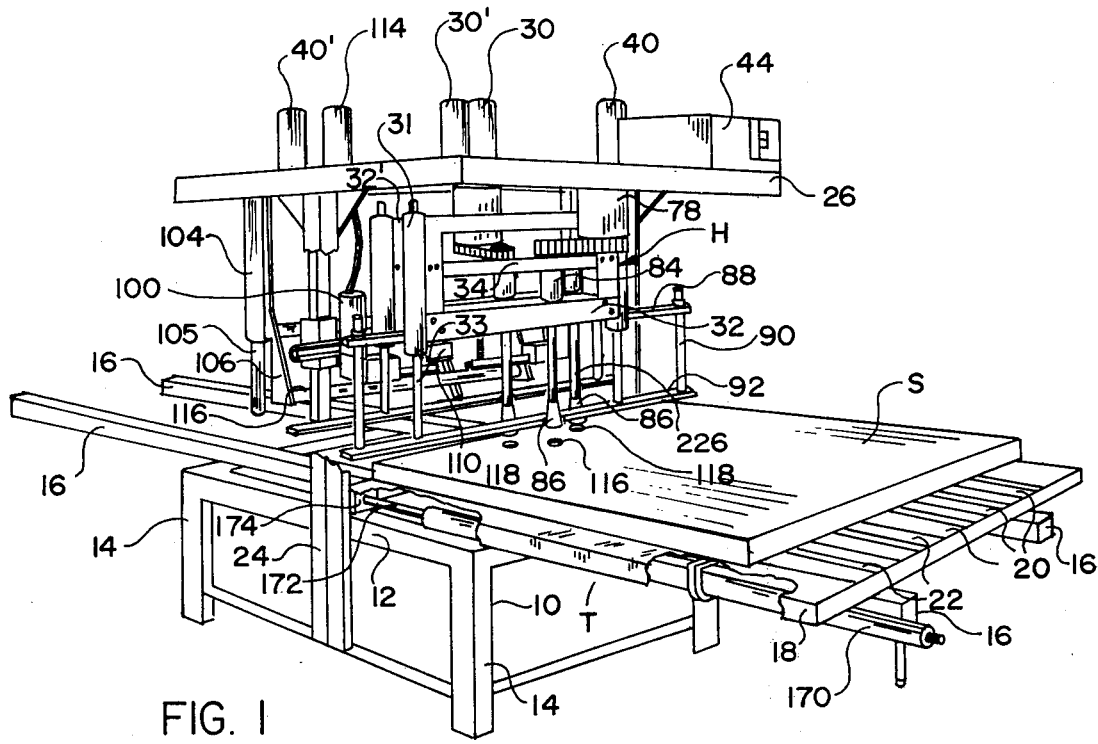
FIG. 1 is a perspective view, with parts broken away, of the apparatus according to the present invention illustrating the table in position just after the operation has commenced.
Figure 3:
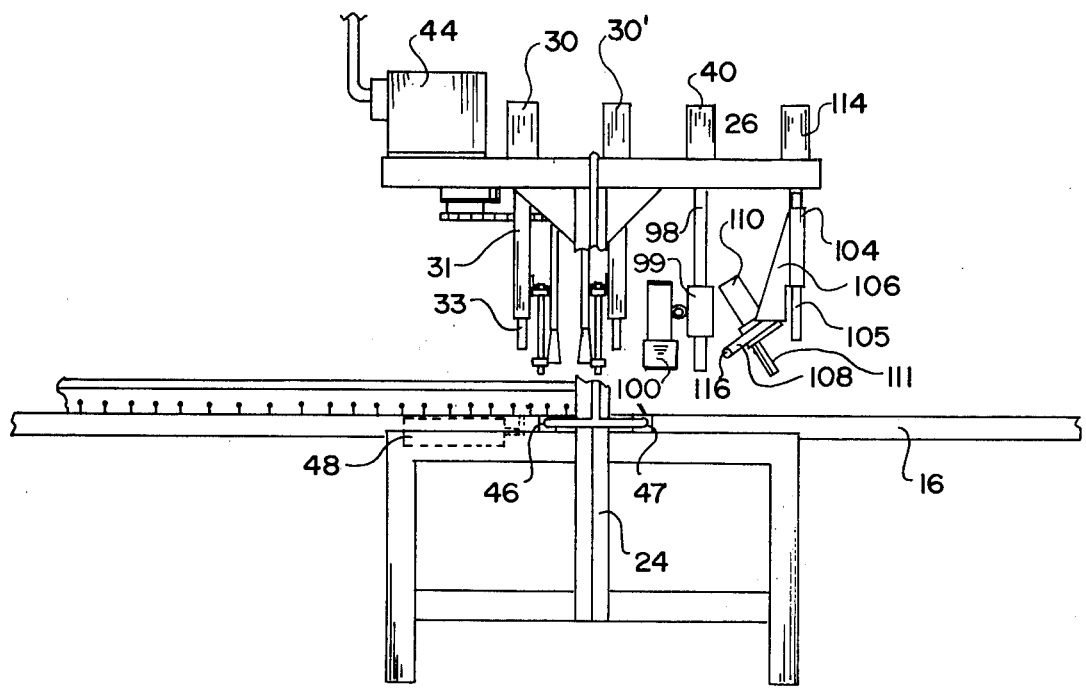
FIG. 3 is a side elevation, with parts broken away, looking at the opposite side from that illustrated in FIG. 1.
Figure 4:
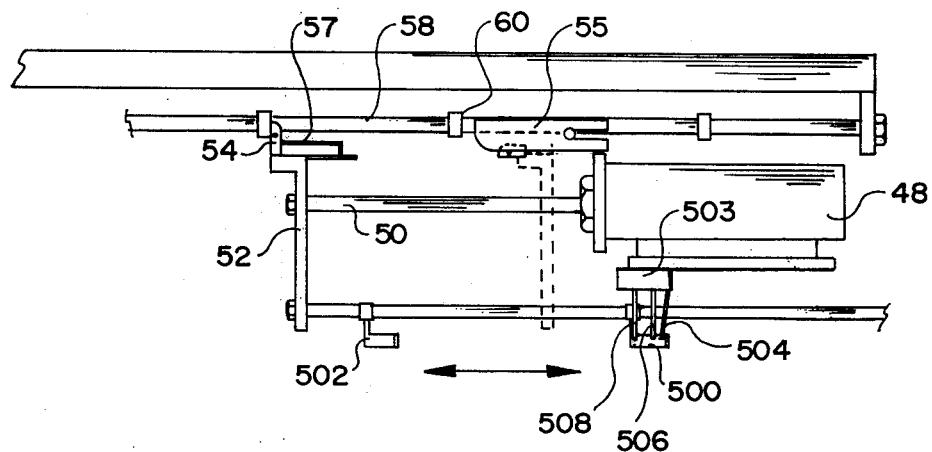
FIG. 4 is a side elevation, with parts broken away, illustrating the table indexing means.

Proceeding now to a description of a specific embodiment of the invention, with reference to FIG. 1, the apparatus of the present invention generally includes a vertically reciprocal operating head H having a plurality of sets of rotary cutters and sawing means mounted thereto. Each set of cutters and/or saws is adapted, when operated, to form a portion of a prescribed pattern of holes and slots in a foam rubber slab S passing thereunder on a reciprocating table T. An indexing means mounted to a stationary portion of the apparatus moves the table past the operating head at prescribed increments. Switch means 46, 47 (FIG. 3) are positioned on a stationary portion of the apparatus support base 10, and are responsive to the incremental indexing of the reciprocating table T to selectively activate prescribed ones of said sets of cutters and sawing means in accordance with a prearranged pattern.

More specifically, the support base 10 of the apparatus includes a lower horizontal rectangular frame 12 supported by a series of downwardly extending legs 14. A plurality of longitudinally extending support rails 16 are mounted atop lower frame 12 and extend both forwardly and rearwardly therefrom along the direction of travel of the reciprocating table T throughout its length, providing support therefor. A pair of upstanding columns 24 are secured to base 10 and extend upwardly therefrom, and an upper frame 26 from which operating head H depends is secured to the upper ends of columns 24.

Figure 14:
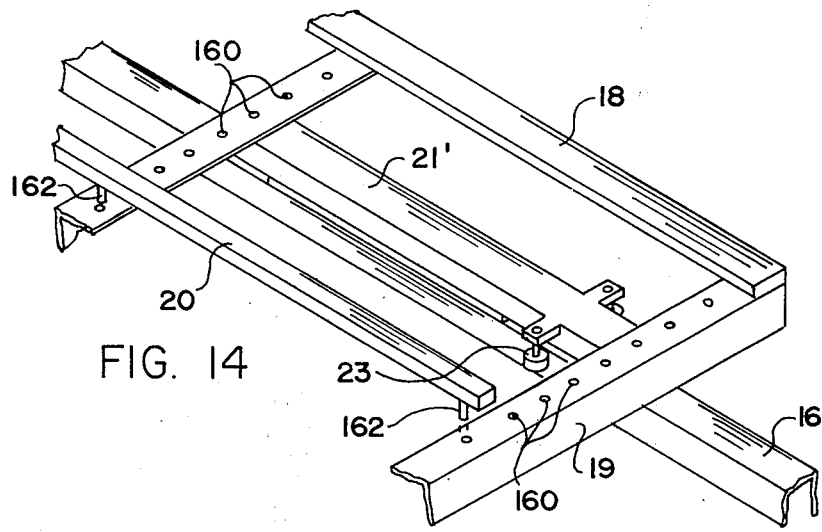
FIG. 14 is a fragmentary perspective view illustrating portions of the table frame and the manner by which the support surface thereof may be formed with openings at varying intervals therein.
Figure 15:
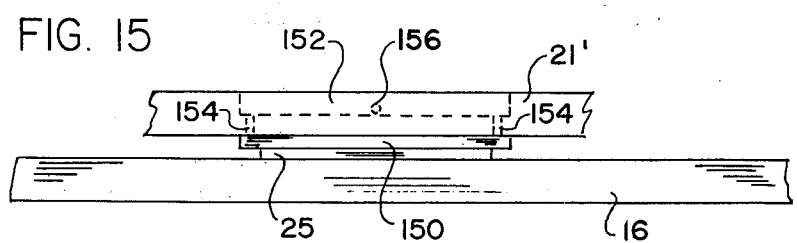
FIG. 15 is a fragmentary elevation view illustrating the manner in which the reciprocal table is mounted on the bed rails.
Figures 16, 16A:
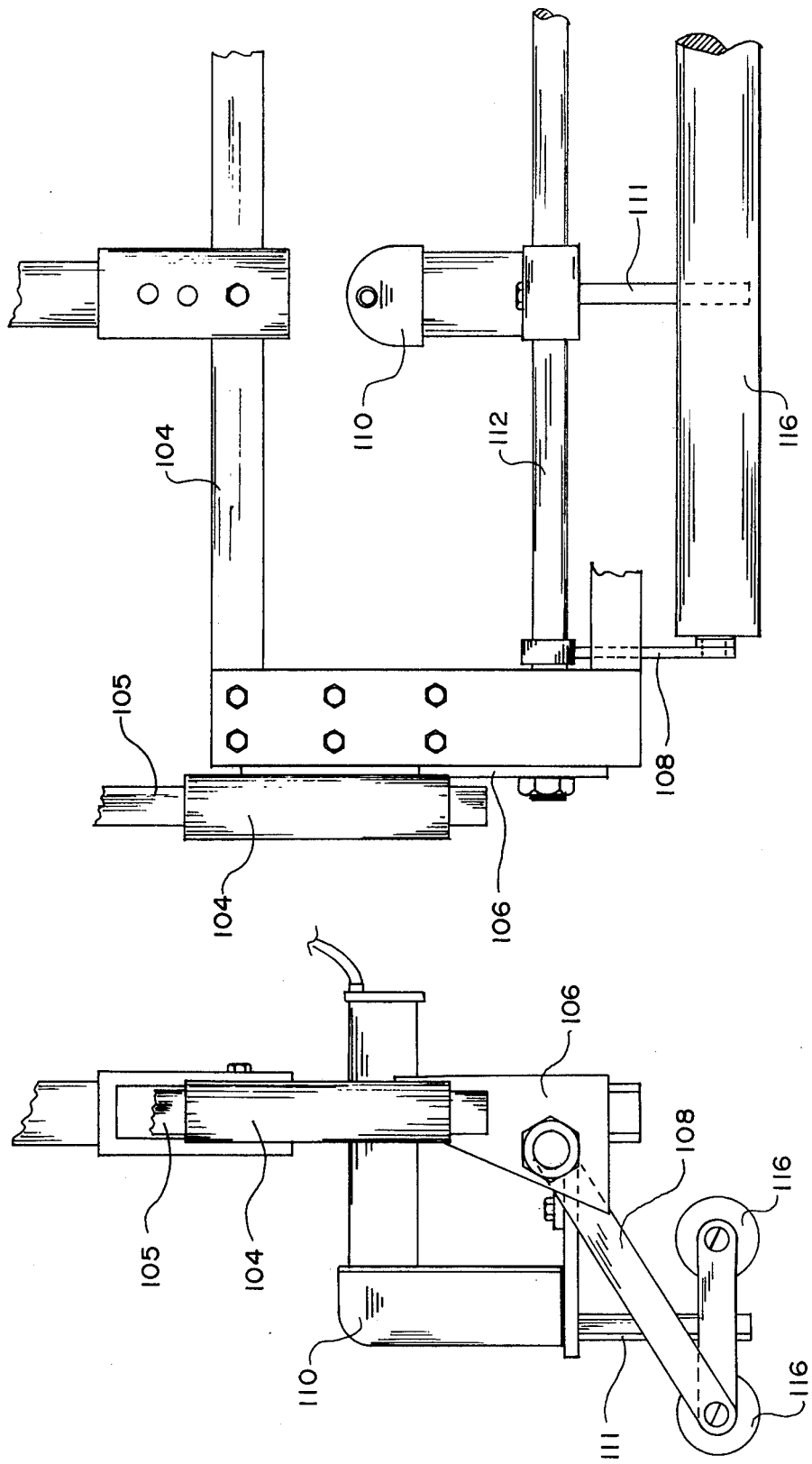
FIG. 16 is a rear view, with parts broken away, looking at the rear of the machine, illustrating the center saw and its associated support apparatus.
FIG. 16A is a side view, with parts broken away, looking at the side of the center saw and its associated support.
Figure 18:
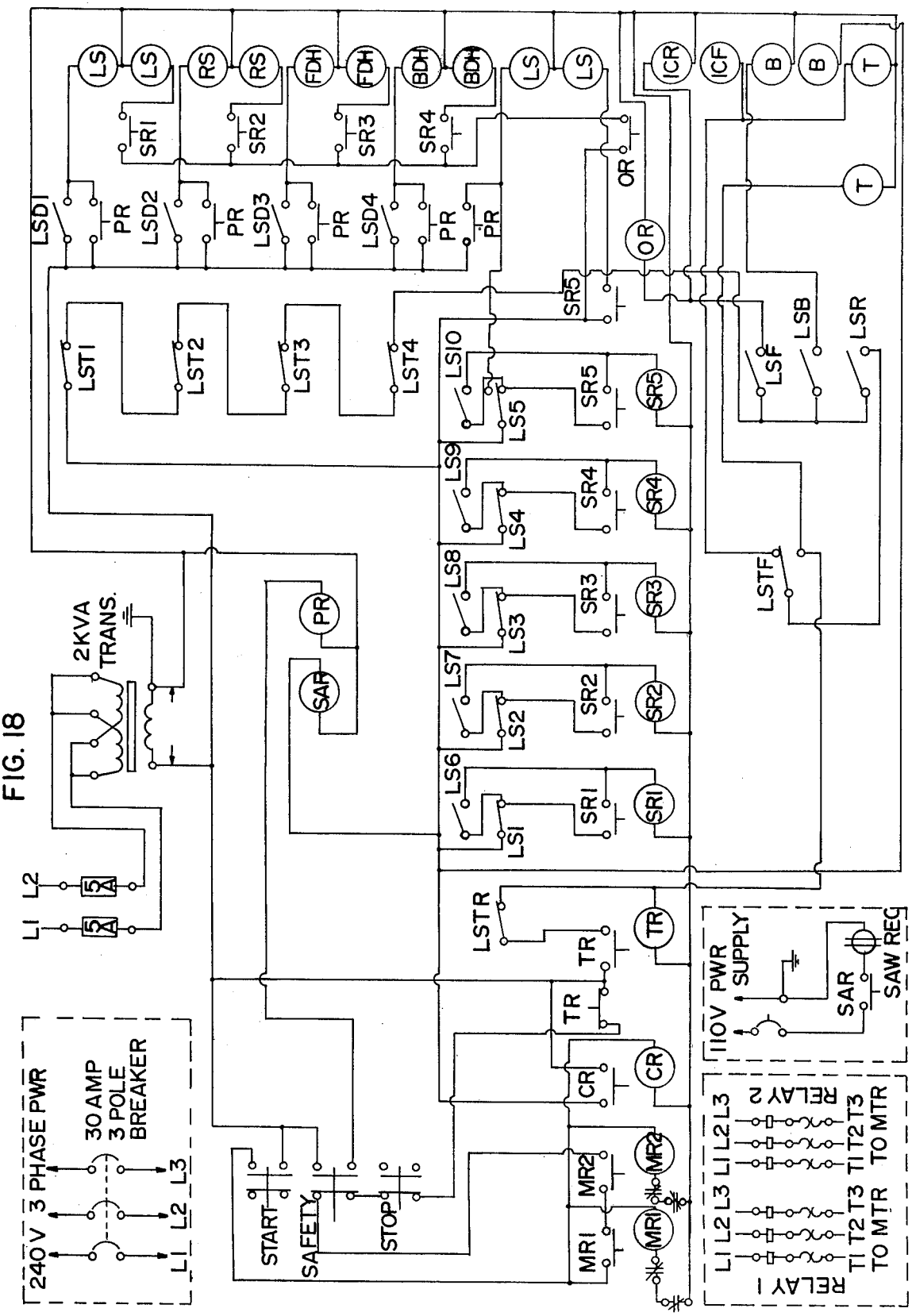
FIG. 18 is an electrical schematic of the present invention.

Horizontally reciprocal table T includes a rectangular support frame 18 having a plurality of transverse cross members 19 (FIG. 14) which reinforce the frame and a plurality of longitudinal elements or rails 21, 21'. One of the longitudinal rails 21 (hereinafter referred to as a braking rail) is used for braking table T at the end of each incremental movement as will be more fully explained hereinafter. The other rails 21' extend the length of frame 18 and are spaced apart the same distance as rails 16, so that they ride atop rails 16 during movement of the table. A plurality of spring biased support pads 25 connect rails 21'' with rails 16, whereby the table T actually slides along rails 16. See FIG. 15. Although not limited thereto, this type of arrangement is better adapted to stop the table T at exactly the point desired, whereas a roller support is harder to stop at a prescribed point and would prove to be prohibitively expensive. Referring to FIG. 15 support pads 25 are preferably formed from a material such as arlite bronze, and are bonded to a base member 150, which in turn is suspended from mounting block 152 by a pair of springs 154. Mounting block 152 is attached to the underside of rail 21' (an inverted U-shaped extrusion) by a pin 156 which extends through mating openings in rail 21' and mounting block 152. A plurality of sets of rollers 23 extending downwardly from rails 21' engage opposite sides of rails 16 at each end of table T to prevent lateral shifting of the table as it moves.

Cross members 19 include a plurality of openings 160 therethrough and support a plurality of wooden rods 20 which, when assembled, form the support surface of table T. Rods 20 include a downwardly extending pin 162 at each end thereof which are received in corresponding pairs of openings 160 in cross members 19, so that the rods 20 may be adjusted laterally to provide clearance openings in the table surface at various points depending on the placement of the cutting tools on the operating head H. Longitudinal and transverse scales, not shown, are adjustably mounted on the surface of table T, so that the foam slab may be initially properly positioned with respect to the number one or leading cutting tool which forms the first opening 116A in slab S.

Although the preferred embodiment utilizes a movable table with the foam slab stationary with respect to the table, it is obvious that the table T might be fixed and the foam slab S moved therealong by means of a series of rollers which engage the slab and slide or move it along the table. The following description, however, is illustrative of the manner in which table T is indexed past the operating head H in the preferred embodiment.

Referring now to FIGS. 4–7, a double acting air cylinder 48 is suitably secured to a stationary portion of lower frame 12 adjacent the underside of table T with the piston 50 thereof adapted for reciprocal movement along the path of reciprocal table T. An upstanding bracket 52 having a yoke 51 at the upper end thereof is attached to the forward end of the piston 50 and includes a bifurcated lug 54 pivotally attached between the spaced portions of yoke 51 at the upper end of bracket 52 (see FIGS. 5 and 6). A stop means 56 secured to yoke 51 immediately behind lug 54 prevents movement in a clockwise direction, however the lug 54 is permitted to pivot approximately 90° in a counterclockwise direction (FIG. 4) for reasons to be hereinafter described. A tension spring 57 attached to the rear of lug 54 normally biases lug 54 in a clockwise direction. A control rod 58 having a plurality of collars 60 secured thereto in spaced relation therealong in attached to the underside of frame 18 in the path of lug 54 as it moves back and forth responsive to the air cylinder 48. The distance between collars 60 corresponds to the distance the table is to be moved with each stroke of the air cylinder or the longitudinal dimension x between adjacent transverse centerlines of holes 116. When patterns require different stroke distances, the spacing between collars 60 must also be changed accordingly.

In operation air cylinder 48 is activated to move piston 50 and lug 54 forward, the piston making a stroke slightly greater than the distance between adjacent collars. As lug 54 moves forward it engages one of collars 60, thus indexing the control rod 58 along with table T to which it is attached throughout a prescribed distance. At the end of such indexing, a braking means to be described hereinafter takes control to stop the table precisely at a prescribed point. Subsequently, the air cylinder 48 is reversed to withdraw or return piston 50 to its normal position. As the piston 50 is withdrawn, the rear edge of lug 54 engages the succeeding collar 60, which causes lug 54 to overcome the bias of spring 57 and pivot in a counterclockwise direction beneath the collar. As lug 54 passes the succeeding collar 60 during the return stroke of piston 50, pin 53 extending transversely from lug 54 is urged beneath cam 55 positioned in the path of pin 53. As the piston 50 then begins its forward stroke and pin 53 clears cam 55, spring 57 will return the lug to its full upright position in preparation for engaging the next collar 60. Cam 55 is slotted as at 55a to enable the cam to be adjusted longitudinally to a prescribed point in the path of pin 53.

At the end of the entire operation on a slab S after the pattern is formed, table T must be returned to its initial position, as will be hereinafter described. During the return of table T, piston 50 remains in its retracted position whereupon pin 53 is held under cam 55 until the table T is returned.

Figure 7:
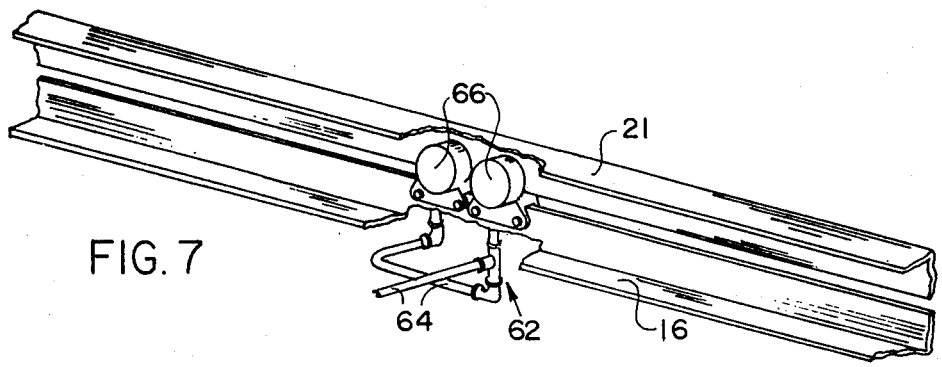
FIG. 7 is a perspective view, with parts broken away for the sake of clarity, illustrating the air brake which facilitates the stopping of the table at the end of each stroke.

Referring now to FIG. 7, an air brake means 62 is attached to one of rails 16 and connected to a source of compressed air by means of conduits 64. Air brake means 62 includes air activated discs 66 on opposite sides of a longitudinal rail 21 of table frame 18. A piston 50 of air cylinder 48 approaches the end of its stroke, a cam 500 engages switch lever 504 from switch 503 to activate the air brake. Air from a separate source (not shown) through conduits 54 force the discs 66 into gripping relationship with the opposite sides of rail member 21 to slow and stop the movement of the horizontally reciprocal table T. Before stopping, cam 500 will also engage switch lever 506 which reverses the flow of air in air cylinder 48 in preparation for the return of piston 50 responsive to a signal from operating head H as will be hereinafter described. Upon such signal, air brake 66 releases and the piston returns to its start position. As the piston 50 returns cam 502 engages switch lever 508 which again reverses the air in cylinder 48, readying the system for the next indexing forward.

At the end of a complete cycle of operation and when the pattern has been completely formed, the indexing of table T moves it to a position on the left hand side of operating head H as viewed in FIG. 1. It is then necessary to return table T to its original position in preparation for the next slab S. To accomplish the return, a return air cylinder 170 is secured to one of rails 16 with the free end of the piston 172 attached to a bracket 174 which in turn is secured to the leading edge of the frame 18 of table T. As the table is indexed along by air cylinder 48, return air cylinder 170 is inactive and the piston 172 is extracted from cylinder 170. When the slab S is completed, the air cylinder 170 is activated and air introduced to the front end, returning the piston 172 to its retracted position with the table along with it. A pumper 176 stops the table as it returns and prevents damage thereto. The return air cylinder is, in effect, a one way air cylinder which acts in reverse to pull table T back to its start position.

Switch means 46 is illustrated in FIG. 8 and comprises a first switch 68 mounted to the upper surface of lower frame 12 immediately beneath the path of one side of the table support frame 18. A plurality of switch levers 70a-f extend upwardly from switch 68 in laterally spaced arrangement across the path of movement of the side edge of support frame 18. A plurality of slotted openings or key ways 72 are arranged along the length of support frame 18 for releasably receiving a plurality of control pins 74 therethrough. Control pins 74 include a shaft 75 which is inserted through opening 72 and a downwardly extending cam portion 76 which is received through the slotted portion of opening 72. The longitudinal spacing between control pins 74 corresponds with the length of the index stroke, so that during the indexing, new operations are cut in during successive index strokes. A permanent magnet 77 is attached to the outer end of shaft 75 and holds pin 74 firmly in place upon assembly. Cam portion 76 is located at different transverse positions along shaft 75 on different pins to activate selected ones of levers 70a-f as the horizontally reciprocal table passes thereby. Depending on which lever 70a-f is engaged, one of a series of operations or combinations of operations are directed to the operating head H. A switch 47 similar to switch means 46 is secured to frame 12 (FIG. 3) at a point further along the path of table T and is activated by another set of control pins 74 having cam portions 76 spaced transversely from the cams 74 which operate switch 68. Switch 47 signals certain elements of operating head H to cut out or stop during successive index strokes as the slab S nears completion. This will be described more in detail in the discussion of the electrical operation.

Figure 12:
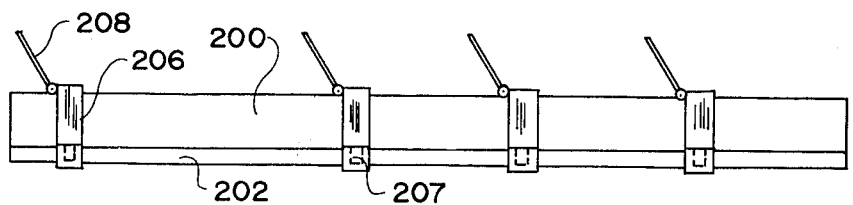
FIGS. 12 and 13 are plan and side views respectively, with parts broken away, illustrating a second embodiment of a switch means for activating selected functions of the operating head as it is engaged by a switch activating means associated with the reciprocal table.
Figure 13:
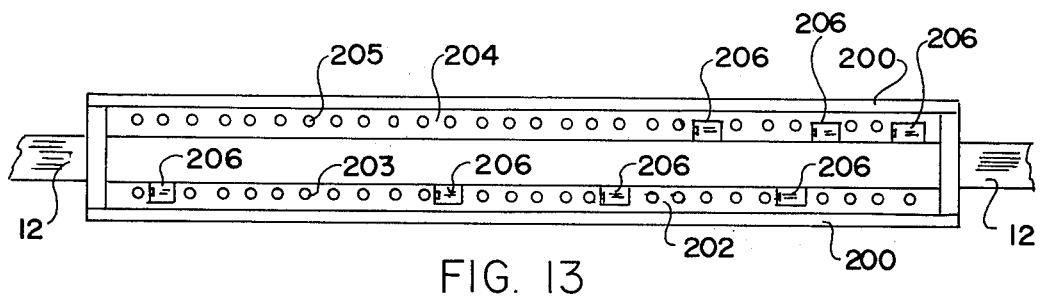

An alternate embodiment of switch means 46 is illustrated in FIGS. 12 and 13 and comprises an elongate frame 200 secured to lower frame 12 and carrying a pair of tracks or elongated plates 202, 204. Switches 206 include a pin 207 which adapt the switches to be positioned in one of holes 203, 205 in tracks 202, 204, at points corresponding in spacing and dependent on the pattern to be formed. Basically the difference in this embodiment and that illustrated in FIG. 8 and described hereinabove is that, here, a plurality of switches 206, each having one upwardly extending lever 208 are positioned at different points along the path of table frame 18 with only one control pin 74 being provided for each track 202, 204, the levers 208 being aligned as opposed to being offset transversely. The control pin engages successive switch levers 208 in track 202 to activate prescribed successive operations of the operating head H. A second pin 74 is aligned with the levers 208 of switches 206 in track 204 to sequentially stop selected operations as the slab S nears completion. Use of the second embodiment of the switch means requires movement of only one control pin to stop the system when changing from short slabs (chairs) to longer slabs (sofas), whereas wholesale changes in the first embodiment of the switch means are required for such a shift in slab sizes.

Figure 2:
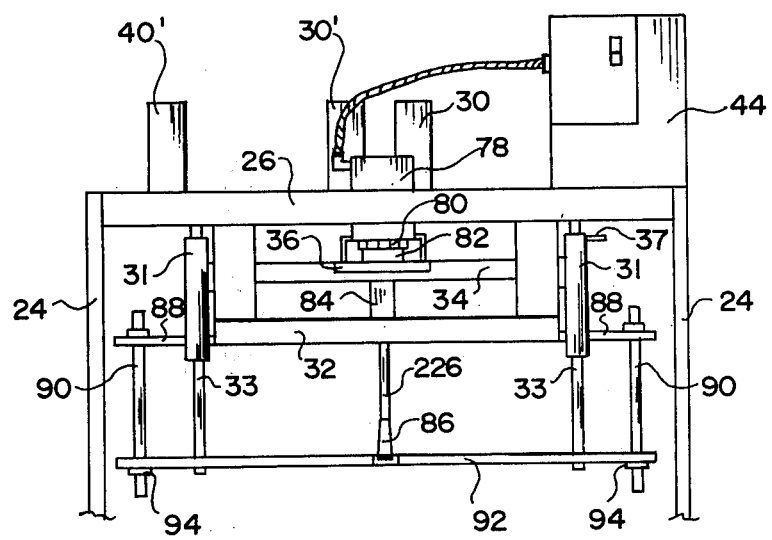
FIG. 2 is an elevation, with parts broken away, illustrating the front end and one reciprocal frame of the operating head.
Figure 9:
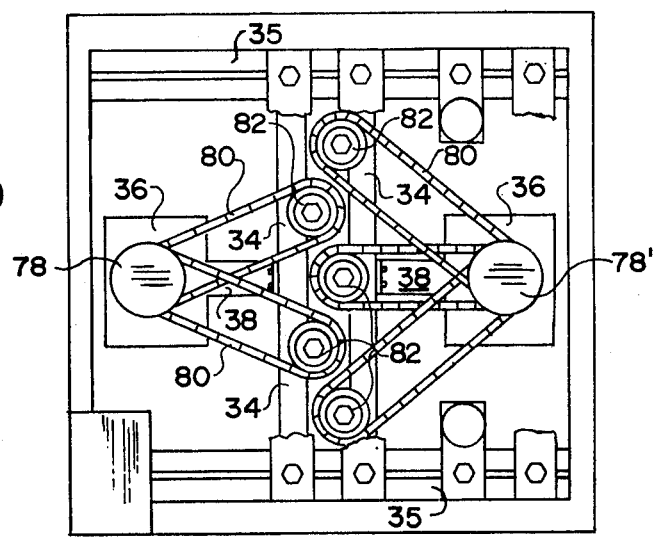
FIG. 9 is a plan view of the operating head alone, with the air cylinders and upper cross members removed, illustrating the manner in which the rotary cutters are connected to and driven by a power source.

The vertically reciprocal operating head H is supported by and depends from an upper support frame 26 and its associated cross members (not shown). As illustrated in FIGS. 1, 2, and 9, a plurality of upright stationary bearing rods 33 are adjustably attached to upper frame 26 and slidably support a pair of vertically reciprocal, upstanding support frames 32, 32' by means of bearing sleeves 31 at either side thereof. A pair of longitudinal tracks 35 (FIG. 9) receive the threaded upper ends of bearing rods 33, and during set up when the rods 33 are properly positioned longitudinally within tracks 35, nuts 35a are tightened to firmly secure the rods in place. So arranged bearing rods 33 form guides for frames 32, 32' as they move up and down and prevent misalignment with the slabs S. Air cylinders 30, 30' are secured atop cross members of the upper frame 26 with the downwardly extending free end of the pistons thereof operatively connected to the upper member of reciprocal support frames 32, 32'. As the air cylinder is operated, the pistons urge the frames 32, 32' up and down on bearing rods 33. Each of frames 32, 32' carries an activating pin 37 which extends laterally from the frame and engages an upper and lower limit switch, not shown, for reversing the air flow in cylinders 30, 30' when the uppermost and lowermost positions are reached.

A motor support plate 36 is secured to cross members 34 of each frame 32, 32' by means of a connecting brace 38. A one-quarter horse power, 3-phase motor 78 is mounted atop motor support plate 36 with the shaft thereof extending downwardly and having connected thereto one or more drive chains 80. The opposite end of each drive chain 80 surrounds a sprocket 82, which in turn is secured to the same shaft as the operating spindle 84 of the corresponding rotary cutting tool. A tapered, hollow cutting tool 86, to be described hereinafter in more detail, is attached at the lower end of spindle 84 for rotary movement therewith to effect the cutting of cylindrical holes 116, 118 in the foam slab S. There are several spindles 84 attached to each frame 32, 32', and each of the spindles do not necessarily have a cutting tool 86 attached to the bottom thereof, as this depends on the pattern to be formed. Further, spindles 84 are secured to a bracket 85 which may be adjusted transversely across the length of each cross member 34, whereby a plurality of holes may be cut with each stroke of frame 32 or 32' and the spacing between the holes may be adjusted.

Figure 11:
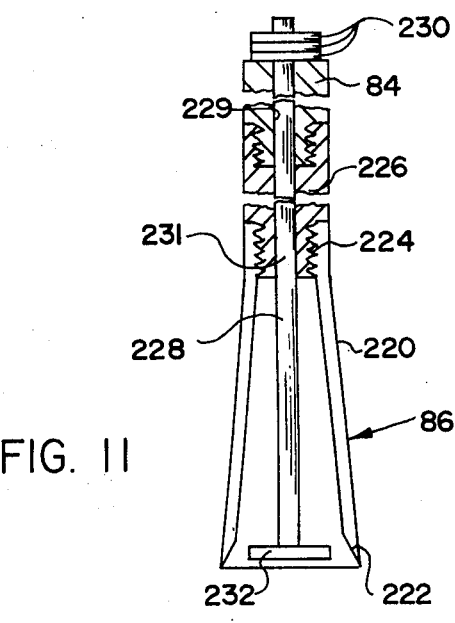
FIG. 11 is a sectional view of a rotary cutting tool specifically adapted for use with the present invention.

Cutting tools 86, as illustrated more specifically in FIG. 11, comprise a hollow, tubular member 220, slightly tapered with the larger diameter at the lower end. The lower end is sharpened into a cutting edge 222, while the upper end includes internal threads 224. A hollow, tubular shaft 226 is secured at its upper end to spindle 84, while the lower end thereof is threaded on both the outside and inside. The upper end of tubular member 220 is received on the outer threads of shaft 226. A floating knockout pin 228 includes an enlarged lower end 232, while the shank 231 thereof extends loosely through a longitudinal bore 229 in shaft 226 and spindle 84. The upper end of pin 228 receives weight 230 which may be added or taken away depending on the thickness of the foam. So arranged, knockout pin 228 floats within shaft 226. Alternately the pin 228 might be spring biased downwardly to bear against the foam slab S during the cutting operation, or the upper end of the pin shank 228 might be secured within or to shaft 226. The tapered member 22 insures a clean, sharp, smooth-walled cut and prevents drag on the cutting tool. Moreover, although not so arranged in this embodiment, the tapered cutting member permits the sawing tools to be used at the same point as the cutting tools, since the taper of the cutting tool clears the upper edge of the hole formed in the foam and allows the sawing to occur as the bottom portion of the holes are cut. Further, the knockout pin pushes the plugs cut from the foam right on through the foam as it is cut.

A pair of laterally extending bracket arms 88 extend outwardly from either end of frames 32, 32' and support a vertically depending support rod 90 thereon. A floating hold down bar 92, having clearance cutouts therein (not shown) which prevents interference with bearing rods 33 during the lowering of frames 32, 32', further includes openings therein for loosely receiving rod 90. Collar 94 attached to rods 90 just below the hold down bar 92 supports hold down bar 92 from beneath. In its normal position, hold down bar 92 is disposed slightly beneath the lower end of cutting tools 86. As the support frames 32, 32' move downwardly, the hold down bar 92 associated with each frame engages and rests by its own weight on the foam slightly ahead of cutting tool 86 and holds it in place, thereby preventing skewing of the foam slab as the tool or tools 85 engage the foam. As the support frames 32, 32' begin the upward return, the hold down bar 92 remains in engagement with the foam until cutters 86 clear the foam, insuring at all times secure implacement of the foam slab S, as well as serving to strip the foam from the cutting tools 86. After the cutting tool 86 has cleared the foam material, collars 94 move back into engagement with the lower surface of hold down bar 92 and elevate it to its normal position.

Figure 10:
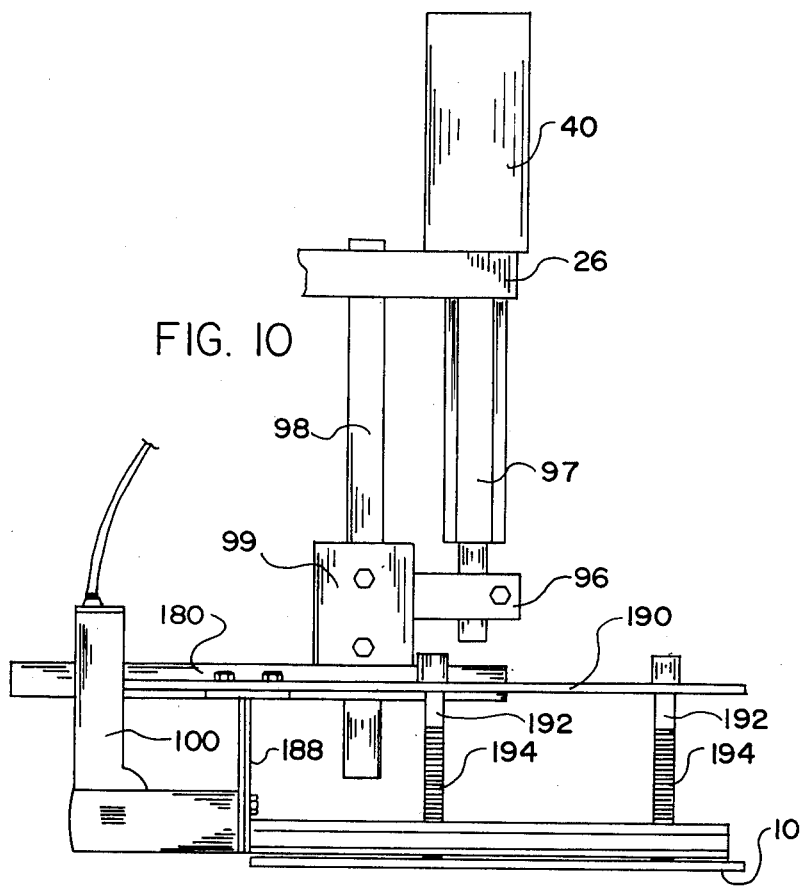
FIGS. 10 and 10A are elevation and side views respectively, with parts broken away, illustrating the manner in which the sawing members are attached to the operating head for vertical reciprocal movement.
Figure 10A:
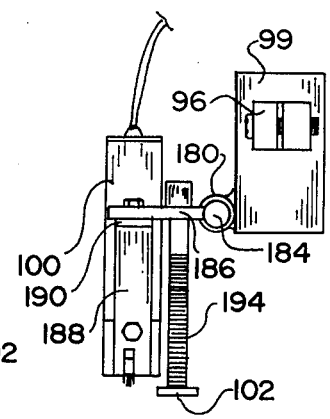

Another pair of air cylinders 40, 40' is also secured to cross members of the upper frame 26 at either side thereof. Referring to FIGS. 10, 10A, a support bracket 96 is operatively connected to the free end of each of the pistons 40 by means of a connecting rod 97. Bearing 99 having a vertical rectangular opening therein is secured to bracket 96 and is slidably received on a rectangular bearing rod 98, whereby the bearing 99 is urged up and down bearing rod 98 by air cylinder 40. Bearing rods 98 are longitudinally adjustable along tracks 35 in the manner herebefore described. A horizontal tubular cylinder 180 is welded to one side of bearing block 99 and includes a longitudinal slot through the wall thereof for receiving knife assembly 182. A shaft 184, of such diameter as to be slidably received in cylinder 180, includes a tang 186 extending through the slot in the wall of the cylinder. A plate 188 extends downwardly from tang 186, and sawing tool 100 is attached thereto. A second plate 190 extends horizontally from tang 186 out above the path of the knife blades, from which a hold down bar 102 is suspended to a point beside the blades by means of studs 192. Compression springs 194 surround studs 192 and engage hold down bar 102 to normally bias it downwardly. The sawing tool 100 is preferably a commercially available electric knife of the type having a pair of reciprocal blades and is moved into and out of engagement with foam slab S in response to the movement of the piston of air cylinder 40. In operation, knife 100 saws side slits 117 extending outwardly from the circumference of certain of the holes in the pattern. The associated hold down bar 102 operates in a manner similar to that described for hold down bar 92 hereinabove, except the bar 102 is biased downwardly by a spring 194. As is the case with hold down bar 92, hold down bar 102 engages the foam at a point prior to the time the foam is engaged by knife 100 and remains in engagement with the foam until the knife has cleared on the return stroke. The slidable engagement of bearing block 99 with rectangular bearing rod 98 prevents skewing or rotation of the knife assembly during operation. Although the knives of saws 100 are illustrated as positioned at a point during the operation subsequent to the forming of openings 116, 118, the use of tapered cutting tools 86 will permit the forming of the side slits simultaneously with the forming of openings 118. Therefore, knives 100 could be positioned at the same point or in line with cutting tools 86, the only requirement being that the air cylinders 40, 40' which operate the knife assemblies would have to be delayed to begin their downward movement at a point in time later than air cylinder 30', and would have to be raised prior to the return of air cylinder 30' to prevent interference of knives 100 with cutting tools 86.

An end or center saw assembly includes a frame 104 depending from the upper frame 26 and slidable in a vertical direction on bearing rods 105 at either side thereof. Bearing rods 105 are longitudinally adjustable along track 35 in the manner described hereinabove. A support bracket 106 depends from frame 104 and provides means for attaching a knife support rack 108. One or more electric knives 110, depending on the number of longitudinal slots to be formed, are attached to an upper rack member 112 with the blades 111 thereof depending downwardly therefrom toward slab S. An air cylinder 114 is mounted atop operating head support frame 26 with the piston thereof extending downwardly and the free end of the piston in engagement with frame 104. As the air cylinder 114 is activated, the entire frame lowers carrying knife 110 to a prescribed position, whereupon as table T is indexed, a slit is formed extending a prescribed depth into the foam and along a line parallel to the axis of movement of the foam slab S. A roller 116 attached to a lower member of rack 108 engages the foam slab during the operation and prevents skewing thereof, much in the manner of hold downs 92, 102. This knife assembly is for the purpose of providing a slit in the foam in a longitudinal direction, as opposed to the lateral slits formed by knives 100 which are positioned at either side of the foam as it passes thereby.

In operation, as the process begins, the slab S is moved to its first position by means of the operation of air cylinder 48 which urges lug 54 against one of the collars of control rod 58. The indexing of slab S continues until a cam 76 operates one of switch levers 70a which causes the first reciprocal support frame 32 to move downwardly and perform its first operation which, in the case of the device shown in FIG. 1, is the forming of a first hole 116 only. As the operating head returns to its upward position, a limit switch signals the air cylinder 48 to move the slab forward to the next position, whereupon another cam 76 positioned slightly different from the first will operate another switch lever 70b of switch 68, whereupon a second operation will be performed upon the foam slab. A third operation may include the sawing of the slits 117 laterally from the side perforations 118 and finally knife assembly 108 may be activated to perform the longitudinal slits 117 extending longitudinally forwardly and rearwardly from openings 116.

Electrical Operation

The 30 ampere circuit breaker is turned to the ON position energizing the line side of motor relay No. 1, motor relay No. 2 and, through 5 ampere fuses, the control transformer. The 110 volt circuit breaker is also turned to the ON position which energizes the line side of SAR relay (power for 110 volt saws). The machine is then ready for operation.

Operation commences by closing the start switch (Start P.B.) energizing motor relay MR1, motor relay MR2, which activates drill motors 78, 78'. Closing of the start switch also energizes control relay CR closing the contacts thereof and beginning automatic operation of the machine as follows:

One branch of the circuit conducts current from the contacts of control relay CR to the unloading side of brake air valve (B) releasing index piston 50 to advance the table T.

Another branch of the circuit carries current from the contacts of control relay CR to relay coil SAR which when energized will close contacts SAR and start saws 100 and 110. Current is also conducted from the contacts of control relay CR through normally closed limit switches LST1, LST2, LST3, LST4, (each located at the return end of drill head pistons 30, 30' or the saw pistons 40, 40') to one side of normally open limit switch LSF (506 in FIG. 4 located at the end of forward stroke of index piston 50), ) to one side of normally open limit switch LSB (504 in FIG. 4 located near the end of forward stroke of index piston 50), and to one side of normally closed limit switch LSR (508 in FIG. 4 located at return end of index piston 50).

Current is conducted through normally closed limit switch LSR to normally open-normally closed switch LSTF (located at the end of the table path) and through the normally closed contacts to the loading side of index piston ICF (50). The signal is also conducted through contact CR to normally open-normally closed, stop limit switch LS5 (located on table) and normally open, start limit switch LS10 which, when operated by a control pin 74, will energize the coil on relay SR 5 and hold through holding contact and stop limit switch LS5. Center saw piston valve 114 is thereby activated which allows cutting of foam until another control pin 74 operates normally open-normally closed stop limit switch LS5 opening the coil SR 5 and making contact with the unloading side of center saw piston valve 114 saw 110 to return to its retracted or non-cutting position.

The selector relay circuit is energized by conducting current to the normally closed stop limit switches LS1–LS4 and normally open start limit switch LS6–LS9. As one of control pins 74 activates one of switch levers 70a–g, corresponding ones of start limit switches LS6–LS9 are closed, activating operation relay OR. The operation is cumulative by means of holding coils SR1–SR4, so that first of all relay SR3 is activated cutting in the forward drill frame 32. As the operation continues the rear drill head 32' is activated, then the left saw and right saw. As the second set of switches in switch means 47, i.e., stop limit switches LS1–LS4 (normally closed), are activated the aforementioned operations are stopped one be one.

During each indexing of table T, the index piston 50 moves the table to the forward position closing limit switch LSB (which operates the brake valve, braking the forward movement) and closing limit switch LSF which energizes the unloading air valve for the index piston allowing the return of index piston to normal position and energizing the operating relay OR which allows operation of valves for left saw piston, right saw piston, forward drill head piston, and back drill head piston, as described hereinbefore.

Example: Providing the control pin 74 has closed limit switch LS6 and thus selector relay SR1, the contacts SR1 will be closed allowing power to be conducted through operating relay contacts OR to the left saw loading valve operating the left saw piston 40' which will lower the left saw, breaking limit switch LST1, contacts (which prevents operation of forward stroke of index piston 50) and slitting foam during the downward stroke. When left saw piston 40' reaches the end of its downward stroke, it will close normally open limit switch LSD1 energizing the unloading coil on left saw piston valve and allowing the left saw piston 40' to return to its normal position. Upon returning to its normal position, normally closed limit switch LST1 is again closed allowing power to again be conducted to limit switch LSR which will begin automatic operation of index piston 50 again and move table forward again. The contacts of selector relay SR1 will remain closed until another control pin engages switch means 47 and opens limit switch LS1.

After the table has reached the end of its intended travel and the pattern formed, normally open-normally closed limit switch LSTF located at forward end of table is operated, breaking contact to the forward index valve coil and the forward traverse valve coil and making contact to the return traverse valve coil and the traverse relay TR which is held through holding contacts and limit switch LSTR (located at return end of table). The traverse piston 172, as a result, is activated to return the table to the normal position. The traverse relay TR also breaks the holding circuit on the machine stopping all other machine operations. When the table is returned to the normal position, the normally closed limit switch LSTR is opened and the relay TR is deenergized allowing operation of machine to begin again when start switch is closed.

The apparatus is equipped with a safety switch (safety P.B.) which when closed will stop all normal machine operation and return saw and drill head pistons to normal positions through PR relay contacts.

The stop switch (stop P.B.) when closed will stop all normal machine operations in whatever position they might be.

While in the foregoing description the invention has been explained in connection with one possible embodiment, it is to be understood that the disclosure is illustrative rather than restrictive, and that changes and modifications may be resorted to without departing from the spirit of the invention as defined by the claims which follow.

What is claimed is:

1. A method for automatically forming holes entirely through and slots partially through the thickness of foam rubber slabs for subsequent use in upholstered cushions for furniture seats and backs according to a prescribed pattern, comprising the steps of:
   a. positioning a slab to be formed on a horizontally reciprocal table;
   b. indexing said table past a vertically reciprocal operating head;
   c. moving selected rotary cutting tools and side slot sawing tools into operative engagement with said slab at the end of selected indexing strokes according to a prescribed sequence;
   d. repeating step (c) until the pattern is formed; and
   e. returning said table to its initial position.

2. The method according to claim 1 wherein the movement of said table engages a switching apparatus to sequentially activate steps (c) through (e).

3. The method according to claim 1 wherein step (b) is activated in response to the completion of each of steps (c) and (d).

4. The method according to claim 1 and further including the step of moving at least one longitudinal slot forming tool into operative engagement with said slab during selected ones of said index strokes.

* * * * *